US006803748B2

(12) United States Patent
Peter

(10) Patent No.: US 6,803,748 B2
(45) Date of Patent: Oct. 12, 2004

(54) SYSTEM AND METHOD FOR CONTROLLING LOAD DUMP VOLTAGE OF A SYNCHRONOUS MACHINE

(75) Inventor: David Allan Peter, Anderson, IN (US)

(73) Assignee: Delphi Technologies, Inc., Troy, MI (US)

( * ) Notice: Subject to any disclaimer, the term of this patent is extended or adjusted under 35 U.S.C. 154(b) by 102 days.

(21) Appl. No.: 10/356,959

(22) Filed: Feb. 3, 2003

(65) Prior Publication Data

US 2004/0150376 A1 Aug. 5, 2004

(51) Int. Cl.$^7$ ............... H02P 9/10; H02P 9/08; H02P 9/14; H02J 7/04; H02J 7/14
(52) U.S. Cl. ............... 322/29; 322/17; 322/28; 322/77
(58) Field of Search ............... 322/17, 26–29, 322/44, 77; 318/432, 727, 805; 363/54, 79

(56) References Cited

U.S. PATENT DOCUMENTS

| | | | |
|---|---|---|---|
| 3,443,197 A | | 5/1969 | Raver et al. ............... 321/18 |
| 3,745,441 A | * | 7/1973 | Soffer et al. ............... 322/20 |
| 3,943,408 A | | 3/1976 | Jakobs et al. ............... 317/13 R |
| 4,757,436 A | | 7/1988 | Ueda et al. ............... 363/54 |
| 4,815,052 A | * | 3/1989 | Walker ............... 363/87 |
| 4,827,393 A | | 5/1989 | Clark ............... 363/79 |
| 4,885,493 A | | 12/1989 | Gokhale ............... 310/190 |
| 4,959,577 A | | 9/1990 | Radomski ............... 310/263 |
| 5,038,092 A | * | 8/1991 | Asano et al. ............... 318/811 |
| 5,214,371 A | | 5/1993 | Naidu ............... 322/29 |
| 5,504,417 A | * | 4/1996 | Kern et al. ............... 322/32 |
| 5,510,696 A | | 4/1996 | Naidu et al. ............... 322/29 |
| 5,648,705 A | * | 7/1997 | Sitar et al. ............... 38/145 |
| 5,719,484 A | * | 2/1998 | Taniguchi et al. ............... 322/20 |
| 5,753,989 A | | 5/1998 | Syverson et al. ............... 310/114 |
| 5,773,964 A | | 6/1998 | Peter ............... 322/20 |
| 5,793,167 A | * | 8/1998 | Liang et al. ............... 318/141 |
| 5,793,625 A | | 8/1998 | Balogh ............... 363/89 |
| 6,002,219 A | * | 12/1999 | Permuy ............... 318/139 |
| 6,081,084 A | * | 6/2000 | Crecelius ............... 318/254 |
| 6,181,111 B1 | | 1/2001 | Hoffman et al. ............... 322/28 |
| 6,195,276 B1 | * | 2/2001 | Sebille ............... 363/127 |
| 6,407,531 B1 | | 6/2002 | Walters et al. ............... 318/805 |
| 6,566,829 B1 | | 5/2003 | Naidu et al. ............... 318/432 |
| 6,566,845 B2 | * | 5/2003 | Taniguchi et al. ............... 322/28 |
| 6,577,097 B2 | | 6/2003 | Krefta et al. ............... 536/24.31 |
| 6,590,361 B2 | | 7/2003 | Walters et al. ............... 318/727 |
| 6,664,768 B2 | * | 12/2003 | Naidu et al. ............... 322/29 |

\* cited by examiner

Primary Examiner—Nicholas Ponomarenko
Assistant Examiner—Pedro J. Cuevas
(74) Attorney, Agent, or Firm—Jimmy L. Funke

(57) ABSTRACT

In an automobile electrical system having an alternator drivingly connected to a vehicle engine the alternator has a polyphase output winding producing a polyphase output in the form of a polyphase alternator voltage for each phase. A load dump apparatus and method for varying the output of the alternator employs a bridge coupled to the polyphase output winding and having a pair of direct voltage output terminals. The bridge has lower and upper switchable elements for each corresponding phase winding, the switchable elements are forward biased and connected in series across the output of the bridge and have a common or neutral input note connected to the corresponding phase winding. Each switchable element is controllable in accordance with a respective conduction signal applied thereto. A controller produces a plurality of conduction signals, which are applied to the switchable elements for controlling the conduction thereof for controlling the conduction timing for each of the lower switchable elements to render them conductive when the output voltage of the corresponding phase winding is above a selected over-voltage limit.

18 Claims, 4 Drawing Sheets

SYSTEM AND METHOD FOR CONTROLLING LOAD DUMP VOLTAGE OF A SYNCHRONOUS MACHINE

TECHNICAL FIELD

This invention relates generally to power generating systems, and, more particularly, to a system and method for controlling load dump voltage of a synchronous machine.

BACKGROUND OF THE INVENTION

A load dump condition is where the electrical load on the alternator, including the battery, goes instantly to zero, for example, via a broken or disconnected wire. A load dump test determines whether transients, for example, voltage transients output by the alternator under various conditions exceed a predetermined threshold. The threshold is selected to protect, for example, semiconductor devices that may draw power from the system as well as to protect the generator equipment as well. A load dump can, however, result in undesirable transients, for example, a voltage spike in the automobile electrical system which transients can cause damage to sensitive electrical and electronic systems.

Typically a load dump apparatus may operate alone or in combination to short circuit the machine; disconnect the load from the machine; or clamp the voltage to some maximum level. For example, short circuiting the machine, while disconnecting the load including the battery, is an effective method to achieve the load dump in an automobile generator operating at or about the maximum output of the machine. However, if the battery is disconnected the system voltage may collapse and the automobile may stall before the system can reinitiate regulation.

In an exemplary conventional system employing an alternator having a polyphase winding and a bridge circuit, when the load dump condition occurs, avalanche diodes employed in the bridge circuit short the phase windings, thereby limiting output voltage to the avalanche voltage limit of the diode. This limit is within the load dump threshold. However, high energy absorbing diodes are required, which increases the cost of the system.

Hoffman et al., U.S. Pat. No. 6,181,111, disclose an alternator for an automotive vehicle having a rotating permanent magnet (i.e., rotor) configured to induce a voltage in a stationary armature in which a three-phase winding is disposed. The winding is configured in a delta arrangement and is coupled to a bridge comprising six controlled rectifiers, an upper and lower rectifier for each phase. The rectifiers are disclosed as being silicon controlled rectifiers (SCRs). The alternator may be configured to produce a conventional output voltage of about 14.5 volts. Hoffman et al. further disclose a relatively complex circuit for responding to a load dump condition. The complex circuit increases cost and limits its usefulness in large scale production. Moreover, Hoffman et al. recognize that a high transient voltage may nonetheless exist for one alternation, notwithstanding the presence of the above complex circuit, and therefore provide for a metal oxide varistor (MOV) across the alternator output terminals as a limiting device. It is believed that such a device would have to be selected to dissipate a large amount of power and accordingly would be of increased cost which is undesirable.

Peter, U.S. Pat. No. 5,773,964, discloses an apparatus for controlling the output and torque of a synchronous alternator and employs a control bridge rectifier and a pulse width modulator (PWM) signal controlled field winding. The bridge in Peter is controlled for establishing a desired phase relationship between the alternating voltage and alternating current of the output winding to control the output and torque of the machine. While Peter discusses no load and short circuit conditions, Peter is concerned primarily with the control of the inductive characteristics of the circuit in order to vary the output and control the torque load on a machine.

There is therefore a need for an improved power generating system that minimizes or eliminates one or more of the problems discussed hereinabove.

SUMMARY OF THE INVENTION

The invention is based upon the discovery that, in an automotive electrical system employing a synchronous generator having polyphase windings, a field winding and a bridge having upper and lower electronically controlled switches operably connected to the polyphase windings, when an over-voltage is detected in any phase, the field is set to a predetermined level, the switches in the upper rectifier are set open so that the upper portion of the bridge operates as a diode bridge, and the lower switches are controlled in accordance with the corresponding current and voltage for the phase to which it is connected, so that each lower switch is off or open for a positive going part of the phase current, and when the phase current voltage exceeds a selected triggering level, the switch for the corresponding phase turns on shorting the phase winding for the remaining portion of the cycle. When the voltage falls below the trigger level the lower switch is turned off.

In an exemplary embodiment the invention is directed to a power generating system comprising a synchronous machine including a multiphase stator winding output and corresponding outputs, and a field winding; a bridge including a pair of electronically controllable upper and lower switches for each phase coupled to the corresponding stator winding output and having a common node, the bridge having an output configured to be coupled to the battery and load of an automobile. A switch controller is operatively connected to open and close the switches to control the bridge output for operation at a predetermined first voltage corresponding to an operating voltage, and in response to an over-voltage condition to close the lower switches to control the bridge at a voltage lower than a first voltage. Concurrently with the over-voltage condition, the duty cycle of the field winding may be set to a predetermined level to insure that the system voltage is maintained at some minimum level. The invention is also operable for use in a permanent magnet synchronous machine.

The invention may also be characterized as a load dump for a power generating system employing a synchronous machine having polyphase output windings producing a polyphase output and which includes a controlled rectifier bridge having an input coupled to the polyphase output windings and an output coupled between a direct voltage output terminal and ground terminal of the bridge. The bridge employs a plurality of electronically controllable switches, each being controllable to respective on and off conditions an accordance with a corresponding conduction signal applied thereto. The plurality of switches are arranged as series connected pairs between the output terminal and ground and have an intermediate node for each pair coupled to the polyphase winding. A switch controller responsively coupled to the output terminal of the bridge produces selected over-voltage conduction signals operative to turn off the upper switches and to turn on the lower switches when the output voltage is greater than or equal to a selected over-voltage condition, and to extinguish the over-voltage conduction signals when the output voltage falls to a level which is less than or equal to a nominal operating voltage below the over-voltage condition.

BRIEF DESCRIPTION OF THE DRAWINGS

The present invention will now be described, by way of example, with reference to the accompanying drawings, in which.

DETAILED DESCRIPTION OF THE PREFERRED EMBODIMENT

Figure 1:
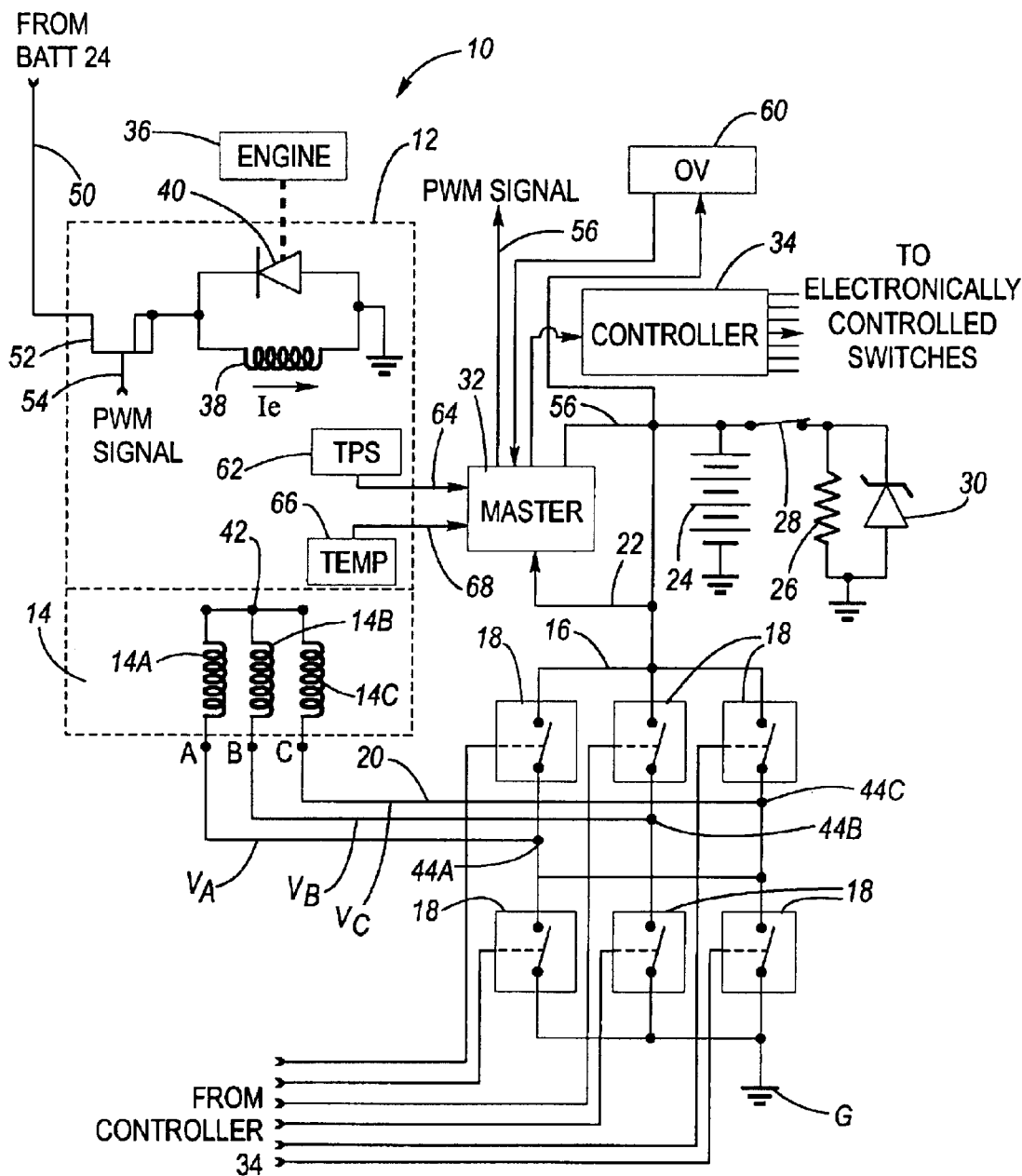
FIG. 1 is a simplified schematic and block diagram of a power generation system employing a load dump feature according to the invention.

Referring now to the drawings wherein like reference numerals are used to identify identical components in the various views, FIG. 1 is a schematic block diagram of a power generation system 10 which employs a load dump feature according to the invention. The power generation system 10 is adapted for use in automobile vehicles and advantageously employs a synchronous alternator 12 including a polyphase stator winding 14, a bridge 16 employing electronically controllable switches 18 and having an input 20 coupled to the winding 14 and a direct current output 22. A battery 24 is coupled to the output 22 of the bridge 16. One or more electrical loads 26 may be coupled to the battery 24 via a switch 28. Optionally a transient voltage limiting device such as a zener diode or a varistor 30 may be coupled across the load 22 as shown. A master controller 32, e.g., microprocessor or other appropriate device, is responsively coupled to the output 22 of the bridge 16 for producing conduction signals. A switch controller 34 is responsively coupled to the master controller 32 and is operatively coupled to the electronically controlled switches 18 of bridge 16 to control gating the conduction signals.

The alternator 12 has a rotor (not shown) which is driven at a variable speed by an engine 36 on a motor vehicle (also not shown). The rotor has a field winding 38 and a suppression diode 40 coupled in parallel as shown. A field exitation current Ie is provided to establish the magnetization of the rotor. As the rotor rotates, an alternating voltage VA, VB and VC is induced in each of the corresponding windings 14A, 14B and 14C of the polyphase winding 14 in a known manner. The frequency of the alternating voltage generated in winding 14 is directly proportional to the angular velocity or speed of rotation of the motor. The magnitude or amplitude of this voltage is also a function of rotor speed and the field excitation current Ie. The latter is controlled by any one of a number of well-known expedients for maintaining the output voltage of the alternator at a desired value, for example 14 volts.

The phase windings 14A, 14B and 14C of the output winding have a neutral point 42 and respective output nodes A, B and C as shown. The output winding 14 of the machine is characterized by generation of a plurality of alternating full cycles per phase. Nodes A, B and C are coupled to input terminals 44A, 44B and 44C at the input 20 of the bridge 16 for converting the three phase alternating voltage output of the winding to a direct voltage at the output 22 of the bridge between the output terminals 46 and 48 as illustrated.

Alternatively, a permanent magnet (PM) synchronous machine may be employed instead of a field excited machine. A wide variety of configurations are known to those of ordinary skill in the art for such permanent magnet alternatives. It should be understood that when a PM alternator is employed field control is not available. However, the load dump feature of the invention would be operable in either case with certain modifications which are hereinafter discussed.

Conductor 50 supplies the current to field coil 38 from battery 24 as shown. Field exitation current Ie is controlled in accordance with an electronic switch 52, e.g., field effect transistor having a gate 54 which receives a pulse width modulator (PWM) signal from the master controller 32 over line 56. The controller 32 is controlled in accordance with program instructions executed thereby. An over voltage detector 60 monitors the output of the bridge 16 in order to determine if an over voltage condition exists. Upon the occurrence of such over voltage condition, the detector 60 provides an input to master controller 32.

The master controller 32 may further monitor an engine throttle position via a TPS sensor 62, which provides an input to master controller 32 on line 64, to determine the desirability of reducing the torque load upon the engine as desired. Additionally, temperature sensor 66 may provide an temperature input to the master controller 32 over line 68. The temperature sensed may represent a measure of battery temperature or other temperature correlated thereto.

In accordance to the invention when an over-voltage condition occurs the master controller produces the PWM signal having a selected pulse rate and applies the same to the gate 54 of the switch 52 which thereby controls and maintains the excitation current Ie at some selected minimal level, typically about 20% of maximum field current. This minimum excitation insures that the alternator produces a minimum current which in turn insures that the system voltage of the automobile does not collapse in the event that the generator output is diverted as hereinafter discussed. It should be understood, that the minimum excitation current may be further reduced to near zero if desired. It is simply desirable to maintain system voltage for a time sufficient to allow the alternator to recover from an overload condition and to enable it to regain regulation. Under normal operating conditions the PWM signal may be varied so as to increase the exitation current as load demand require.

Figure 2:
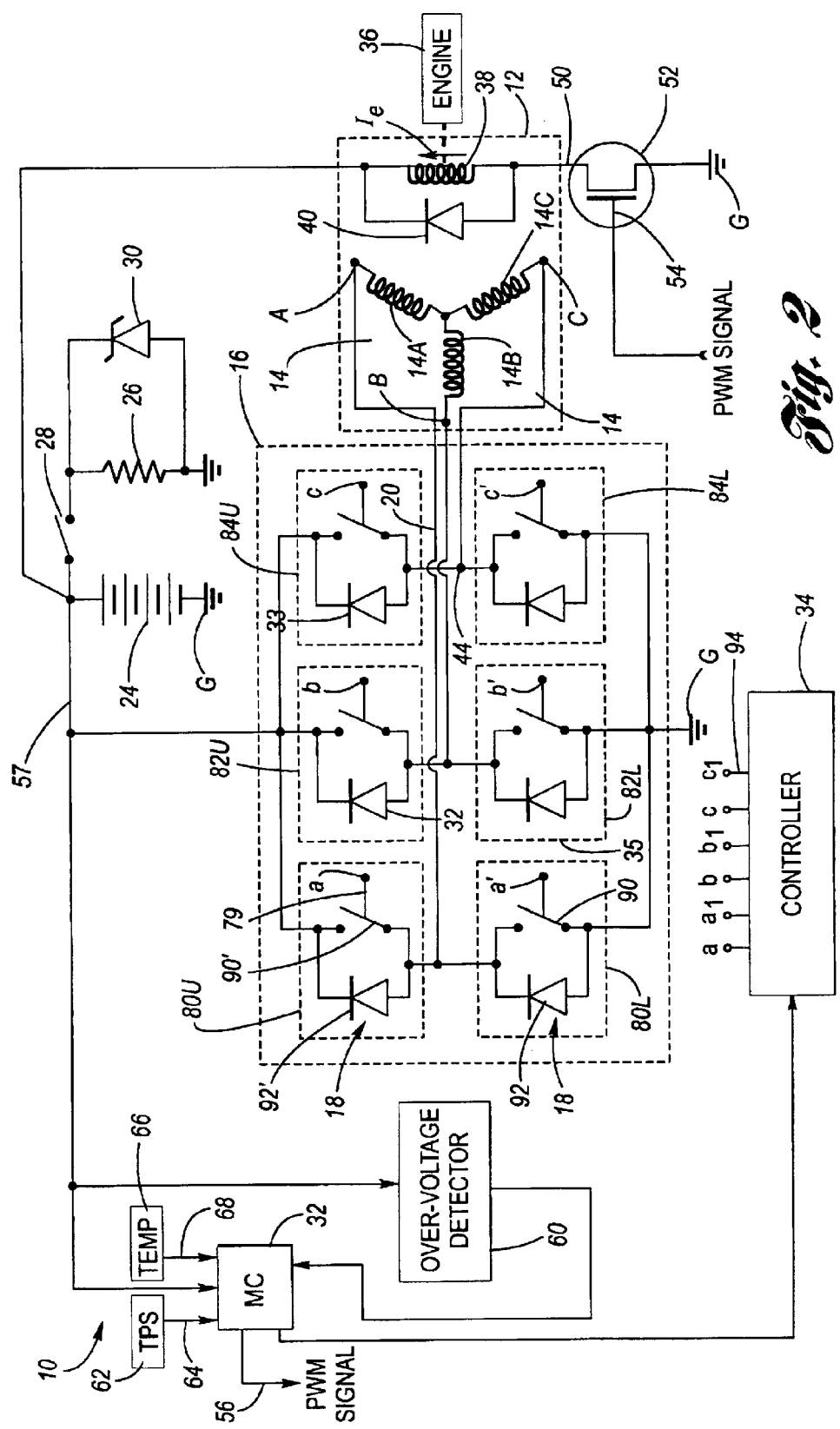
FIG. 2 is a more detailed schematic diagram of the circuit shown in FIG. 1.

As illustrated in FIG. 2, the bridge employs the electronically controlled switches 18, which in the exemplary embodiment are arranged in pairs of series connected lower and upper switch elements 80L–80U, 82L–82U and 84L–84U for each corresponding phase 14A, 14B and 14C respectively. The electronically controlled switches 18 are connected as shown. Lower switch elements may be depicted a parallel combination of a normally open controllable switch 90 and a diode 92. Upper switch elements may likewise be depicted as a parallel combination of a normally open controllable switch 90' and diode 92'. When the switch 90 is controlled to the open position the lower control operates as a free wheeling diode 92. When the switch 90 is closed, the control rectifier operates as a short circuit.

In an exemplary embodiment the electronically controlled switches 18 may take various forms. For example the switches may be in the form of FET switches or silicon control rectifiers (SCRs) or TRIAICs. The SCRs would be connected in anti parallel in the lower switches. Another expedient could employ a conventional bridge rectifier with three reverse SCRs in the lower switches. In the latter case the SCRs would be connected in is a conventional device which has a gate which may be energized to cause the device to conduct. An SCR is a latchable device which means that once gated on, it continues to conduct until the diode element sees a reversed bias at which point the SCR self commutates off.

In the exemplary embodiment each switch element 80L–81U, 82L–82U and 84L–84U has a corresponding control terminal a-a1, b-b1 and c-c1, which in the exemplary embodiment, corresponds to the control for the switches 90'–90' in each of the switch elements as described above. The switch control 34 has gate outputs 94, which have corresponding terminals a-a1, b-b1 and c-c1 coupled to the corresponding control terminals.

Master controller 32 may produce normal conduction signals for the governing the switch controller 34, for example when the system is operating at or below the maximum allowable voltage. When an over voltage condition occurs, as sensed either directly, or as shown, by the over voltage detector, the master controller 32 may produce an alternative set of switch control signals for controlling the switch controller 34. Alternatively, the switch controller 34 may directly control the condition of the output terminals a-a1, b-b1 and c-c1 under normal conditions, and when an over voltage condition occurs the switch controller 34 may be operative in response to the over voltage detector 60 to select an alternative series of switch conditions to control the terminals a-a1, b-b1 and c-c1.

In the exemplary embodiment, the switch controller 34 responsive to the master controller 32 controls the conduction timing of outputs a, b, c-a1, b1, c1 for operating the bridge 16 under normal operating conditions, that is, when no over-voltage condition is sensed. Under such conditions, the switches 90 and 90' are operated in accordance with conventional timing sequences to control the generator output. However, if an over-voltage condition is sensed, the master controller 32 is responsive to produce different conduction timing signals and the switch controller 34 controls the conductive states such that switch 90 in lower switch element 80L is closed for shunting out the corresponding phase winding and driving the output for the corresponding phase to zero. Switch 90 in lower switch element 80L remains closed shunting the phase winding 14A for the remaining portion of the phase. At the same time the upper switch 90' is open and diode 92' operates as free wheeling diode. If the over-voltage condition persists, then in a similar manner the switch 90' of lower rectifier 82L is closed to shunt the phase winding 14B for that portion of the cycle that the over voltage condition exists. Likewise, the switch 90 of lower rectifier 84L is operated to shunt the phase winding 14C. In addition, when the over voltage condition exists, the master controller 36 produces the appropriate PWM signal to limit the field current Ie.

As long as the over-voltage condition exists during any cycle the corresponding state of the switch element 90—90 in the switches 18 are maintained and the field current is limited. However, when the over-voltage condition dissipates, the bridge 16 is enabled to operate under normal conditions and the limitation on the field excitation current is released.

Figure 3:
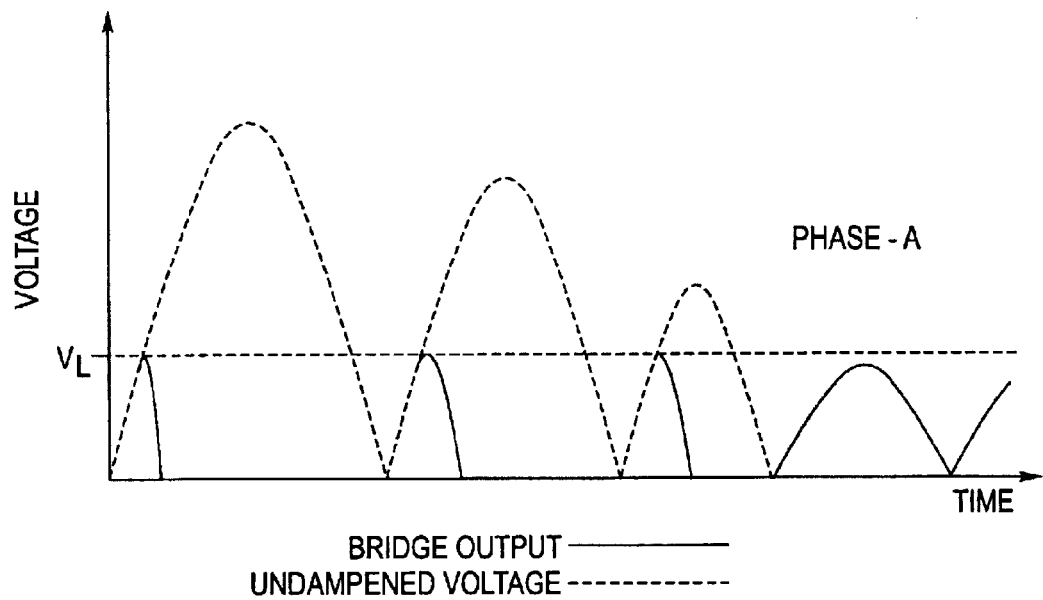
FIG. 3 is a timing diagram illustrating the output voltage of the circuit of FIG. 1 with an unclamped over-voltage condition superimposed thereon.

FIG. 3 illustrates the output voltage of the bridge during an over-voltage condition. The dotted wave-form represents the uncontrolled or unclamped bridge output and the solid line wave-form represents the clamped or controlled voltage condition. An over-voltage condition exists when the unclamped output voltage of the bridge 16 exceeds limit voltage VL. Upon the occurrence of an over-voltage condition in any phase, the gate controller 34 gates the corresponding switch 90 in corresponding lower switch element 80L, 82L and 84L, as the case may be, to an on, or closed condition thereby short circuiting the corresponding output winding 14A, 14B or 14C.

Figure 4:
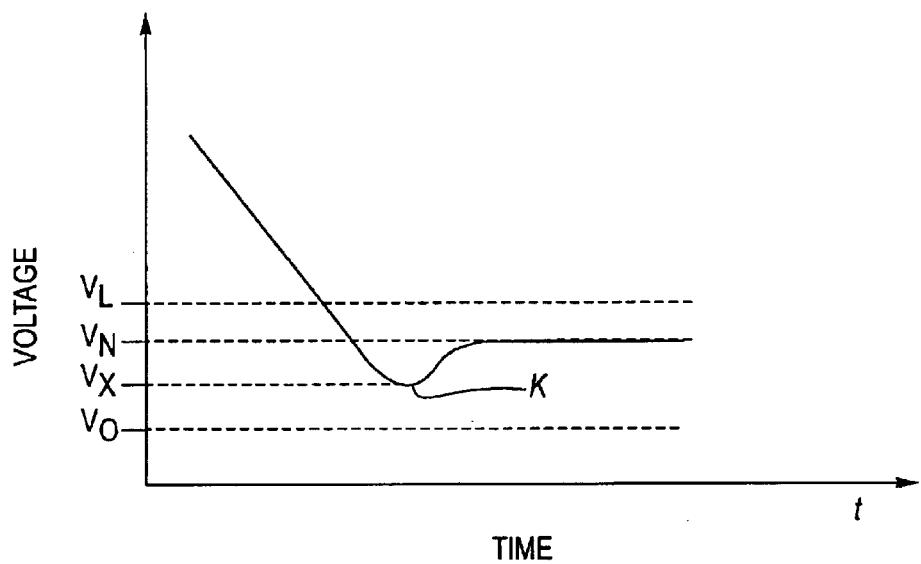
FIG. 4 is a wave form diagram showing the voltage recovery as a function of time.

The dotted line wave-form depicts the output wave-form for one phase voltage only, namely phase A of winding 14A. It should be understood that phase windings 14B and 14C produce similar waveforms, but these are not shown because the behavior of phase voltage A is exemplary. The dotted line illustrates the uncontrolled output of winding 14A during an over voltage condition. The solid line illustrates the output of the winding 14A, controlled in accordance with the invention. When the uncontrolled voltage limit VL is exceeded, i.e., when the output of the winding 14A exceeds the voltage limit VL (14 V)(dotted line), the output of the rectifier is momentarily shut down for the remaining portion of the phase output (solid line). The solid line wave-form illustrates that the uncontrolled voltage output of winding 14A is immediately brought to zero when an over voltage condition is sensed. The same control is implemented for windings 14B and 14C. As can be appreciated from an inspection of the drawing, when the over-voltage condition exists the output of the winding is brought to zero for the remaining portion of the phase cycle. As the over-voltage condition subsides, the unclamped voltage eventually falls below the limit value VL and the phase voltage is eventually released allowing it to produce a full cycle of output energy. Likewise when the over-voltage condition subsides the field exitation is allowed to operate at a higher level so as to meet varying load conditions As illustrated in FIG. 4, when the over-voltage condition subsides, it typically falls below the limit value VX to some value and then recovers to the nominal value VN. The voltage passes through a knee K or minima in the curve. The field current is typically set so that the minima K does not diminish to zero or near zero volts VO for any appreciable time which would cause the system voltage to collapse. If the response time of the system is fast, the excitation current may be reduced to allow the system voltage to approach zero without significantly risking system voltage collapse. If the system has a slower response time, then the value of the excitation current may be set at some higher value, for example, 20% which will allow the system voltage to fall below the limit and yet be sufficient to maintain the system voltage for a time sufficient for the system to recover.

As noted above it is possible to operate the system using a permanent magnet (PM) synchronous motor. With such an arrangement it is not possible to employ field control to reduce the generator output. Accordingly, when the lower switches are closed, the machine current will increase to some maximum. Under such conditions, because the currents are essentially uncontrolled, it is necessary to provide for more robust switching elements. On the other hand, if a field control motor is employed, as illustrated hereinabove, when the windings are shorted, the system will produce a maximum current which corresponds to the field excitation current established by the PWM control. Accordingly, the energy dissipating capability of the rectifier switches may be significantly reduced.

Figure 5:
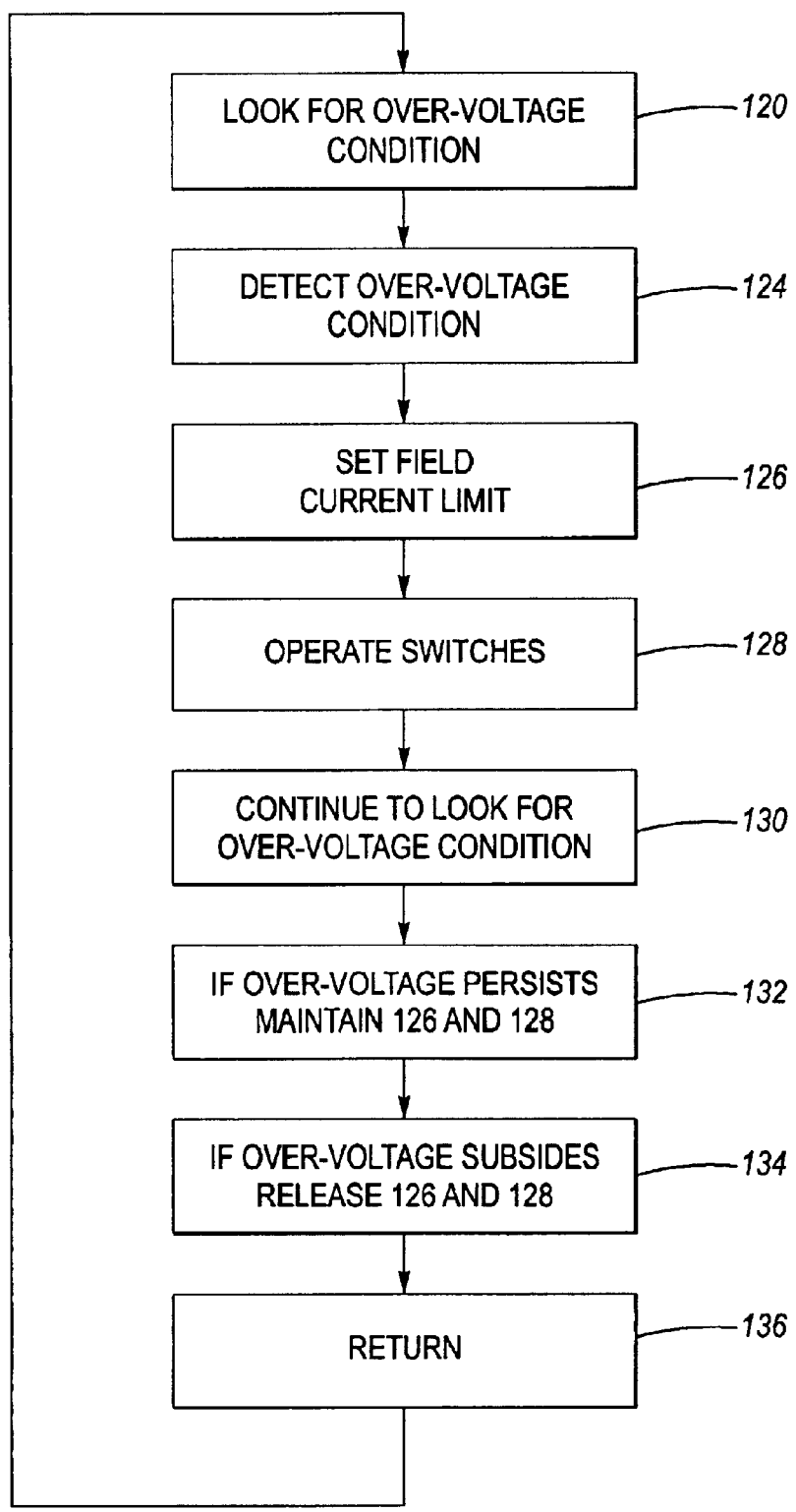
FIG. 5 is a block diagram showing the method steps.

FIG. 5 illustrates in schematic block form a method for operating a synchronous power generator in accordance with the present invention. The system looks for an over-voltage condition at 120 and upon the occurrence of such condition, the system detects the over-voltage condition at 124. If such condition exists, the field current limit is set at 126 and the switch controller operates the lower switches at 128 such that lower rectifiers to limit the output of the corresponding phase windings. The system continues to look for an over-voltage condition at 130. If the over-voltage condition persists, the conditions at 126 and 128 are maintained at 132. If the over-voltage condition subsides the system releases the field current maximum and releases the switch constraints at 134. Thereafter the system continues to look for a over-voltage condition as exemplified by the return to block 136. It should be understood that if a permanent magnet machine is employed the current limiting step 124 and corresponding release at 134 are not employed.

What is claimed is:

1. In an automobile electrical system having an alternator drivingly connected to a vehicle engine, the alternator having a polyphase output winding producing a polyphase output in the form of a polyphase alternator voltage for each phase, a load dump apparatus for varying the output of the alternator comprising:

a control bridge coupled to said polyphase output winding and having a pair of direct voltage output terminals, said control bridge including a first switchable element and a second switchable element for each corresponding phase winding, said first and second switchable elements being connected in series across the output of the bridge and having a common input note connected to the corresponding phase winding, each controllable in accordance with a respective conduction signal applied thereto, a controller for generating a plurality of conduction signals, said conduction signals being applied to said first and second switchable elements for controlling the conduction thereof under normal operating condition and for controlling the switchable elements under an over voltage condition; and wherein the normal operating condition occurs when the output voltage of each phase winding is up to a selected limit and the over-voltage condition occurs when the output voltage of any phase winding is above the selected limit, the conduction of the first switching element for a phase being on for a time when the corresponding phase voltage is above the selected limit.

2. An apparatus according to claim 1, wherein the first switchable elements comprise at least one of a rectifier, a silicon control rectifier, a field effect transistor and a TRIAC.

3. An apparatus according to claim 1, further including an over-voltage sensing device for sensing an alternating voltage in each phase winding of the polyphase output winding and producing a voltage level signal therefrom.

4. An apparatus according to claim 3 including means comparing the phase voltage in each phase winding with a selected voltage limit to generate an over voltage signal, said controller responsive to the signal for adjusting the conduction timing of the conduction signals so as to reduce the phase voltage to a desired level.

5. An apparatus according to claim 1, wherein the first and second switchable elements include rectifiers.

6. The system according to claim 5 when the rectifiers comprise diodes being forward biased relative to the output coupled between the neutral point and ground.

7. The system of claim 1, further including at least one of a zener diode and varistor coupled to the bridge output.

8. The system of claim 1, wherein the stator winding output is a three phase stator winding.

9. The system of claim 1, wherein conduction control signals comprise gate pulses for respective switchable elements.

10. The system of claim 1 wherein the over-voltage condition occurs when at least one of the phase voltages exceeds 14 volts.

11. The system of claim 1, wherein the computer includes a comparator for comparing the output voltage with a reference indicative of an over-voltage condition.

12. The system of claim 1 wherein the switchable elements for each phase comprise first and second switchable elements comprise forward biased diodes.

13. The system of claim 12, wherein the first switchable elements comprise a rectifier and a parallel coupled normally open switch.

14. The system of claim 1, wherein the alternator comprises at least one of a synchronous alternator and a permanent magnet alternator.

15. In an automotive electrical system having an alternator drivingly connected to a vehicle engine, said alternator having a polyphase output winding for producing a polyphase output in the form of a polyphase alternating voltage and a bridge having a direct current output, including a first and second series connected switchable elements for each phase coupled across the output and coupled to each corresponding phase winding at a neutral point therebetween, a method for varying the output of the alternator comprising the steps of:

generating a plurality of conduction signals for each corresponding phase of the polyphase alternating voltage;

sensing the voltage in each phase winding of the polyphase output winding;

applying the conduction signals to the switchable elements of the bridge;

comparing the output voltage with a selected voltage limit; and adjusting the conduction timing of the conduction signals for only the first switchable elements so as to reduce the voltage for the phase below the voltage limit.

16. The method of claim 15, wherein the alternator has a field winding and further comprising adjusting the current in the field winding to regulate the output voltage of the alternator.

17. The method of claim 16 wherein the adjusting step further comprises limiting the stator current to control the minimum output voltage of the alternator to a percentage of the maximum allowable output voltage during an over-voltage condition.

18. The method of claim 15 wherein limiting the minimum output voltage comprising maintaining a minimum voltage sufficient to prevent system voltage collapse.

* * * * *